United States Patent [19]
Valint, Jr. et al.

[11] Patent Number: 5,981,669
[45] Date of Patent: Nov. 9, 1999

[54] SILICONE-CONTAINING PREPOLYMERS AND LOW WATER MATERIALS

[75] Inventors: Paul L. Valint, Jr.; Yu-Chin Lai, both of Pittsford; Edmond T. Quinn; Daniel M. Ammon, Jr., both of Rochester, all of N.Y.

[73] Assignee: Bausch & Lomb Incorporated, Rochester, N.Y.

[21] Appl. No.: 09/069,785

[22] Filed: Apr. 29, 1998

Related U.S. Application Data

[60] Provisional application No. 60/068,911, Dec. 29, 1997.

[51] Int. Cl.$^6$ .................................................. C08F 283/12
[52] U.S. Cl. ........................... 525/477; 526/279; 528/26; 528/28; 528/29; 528/38
[58] Field of Search .................................. 528/26, 28, 29, 528/38; 526/279; 525/477

[56] References Cited

U.S. PATENT DOCUMENTS

| | | | |
|---|---|---|---|
| 4,153,641 | 5/1979 | Deichert et al. | 260/827 |
| 5,010,141 | 4/1991 | Mueller | 525/276 |
| 5,034,461 | 7/1991 | Lai et al. | 525/100 |
| 5,336,797 | 8/1994 | McGee et al. | 556/419 |

OTHER PUBLICATIONS

Lai, Yu–Chin, "The Role of Bulky Polysiloxanylalkyl Methacrylates in Polyurethane–polysiloxane Hydrogels", Proceedings of the American Chemical Society Division of Polymeric Materials: Science and Engineering, vol. 72, pp. 118–119 (1995).

*Primary Examiner*—Jeffrey T. Smith
*Assistant Examiner*—Caixia Lu-Rutt
*Attorney, Agent, or Firm*—Mary Anne Magee; John E. Thomas

[57] ABSTRACT

Low water silicone-containing elastomers are based on a hydroxy- or amino-terminated prepolymer derived from an ethylenically unsaturated silicon-containing monomer, and at least one monomer reactive with hydroxyl- or amino-functional radicals of the prepolymer. The elastomers are especially useful as contact lens materials.

21 Claims, No Drawings

SILICONE-CONTAINING PREPOLYMERS AND LOW WATER MATERIALS

This application claims the benefit of U.S. Provisional Application No.: 60/068,911 filed Dec. 29, 1997.

BACKGROUND OF THE INVENTION

The present invention generally relates to silicone-containing materials useful as a contact lens material.

Polymeric silicone materials for contact lens applications include hydrogels and non-hydrogels. The non-hydrogels may include rigid materials, useful for rigid gas permeable contact lenses, or flexible materials useful for soft contact lenses. Whereas hydrogels typically include appreciable amounts of hydrophilic monomers and/or internal wetting agents and absorb and retain appreciable amounts of water, the non-hydrogel silicone materials do not include appreciable amounts of such hydrophilic monomers or wetting agents. Therefore, these "low water" non-hydrogel silicone materials do not absorb or retain appreciable amounts of water, for example, less than about 5 weight percent, and more typically less than about 1 or 2 weight percent.

It is important that low water silicone compositions, especially for soft contact lens applications, have desirable oxygen permeability, modulus and elastic recovery characteristics. This is particularly important in the formation of soft contact lenses, as the modulus (Young's modulus of elasticity) and elastic recovery of the lens material can have a significant impact upon lens "comfort". Lenses possessing high modulus often have a perceived stiffness; lenses with too high elastic recovery can exhibit a "suction cup" effect on the eye.

One class of silicone monomers commonly used in silicone-containing contact lens materials are bulky polysiloxanylalkyl methacrylates, e.g. methacryloxypropyl tris(trimethylsiloxy) silane (commonly referred to as "TRIS"). Since these "bulky" monomers contain a large amount of silicon per molecule, they are useful for increasing oxygen permeability of materials, a desirable property for contact lens and other biomedical device applications. However, although TRIS is known to reduce the modulus of some silicone hydrogels, i.e., polyurethane-polysiloxane hydrogel compositions, (see for example; Lai, Yu Chin, *The Role of Bulky Polysiloxanylalkyl Methacrylates in Polyurethane-polysiloxane Hydrogels,* Proceedings of the American Chemical Society Division of Polymeric Materials: Science and Engineering, Vol. 72, pg. 118–119, (1995)), the use of TRIS monomeric units within "low water" silicone compositions generally increases the modulus of the resulting material. As such, TRIS monomeric units are not generally helpful in reducing the modulus of low water silicone materials.

Another class of silicone monomers known for silicone-containing contact lens materials are elastomers based on ethylenically endcapped polydimethylsiloxanes, such as the polydimethylsiloxanes disclosed in U.S. Pat. No. 4,153,641. These materials usually provide elastomers with relatively low modulus.

In summary, low water silicone materials are sought for soft contact lens applications which possess relatively low modulus, for example from 20 g/mm$^2$ to about 150 g/mm$^2$, and with a suitable elastic recovery rate. Furthermore, for such applications, the materials must be optically clear, manufacturable (e.g., capable of being molded or machined), have acceptable oxygen permeability, biocompatibility and resist deposit formation. Moreover, low water materials are desired that can be cast into articles such as contact lenses by methods other than free radical polymerization, for example, by injection molding.

SUMMARY OF THE INVENTION

The present invention relates to a silicone composition, preferably a low water silicone composition, which is the polymerization product of a mixture comprising:

(A) a hydroxy- or amino-terminated prepolymer prepared by reacting the following components:
  (a) 60 to 95 mole % of an ethylenically unsaturated silicon-containing monomer,
  (b) 2.5 to 20 mole % of an ethylenically unsaturated monomer containing a hydroxyl or amino radical,
  (c) 2.5 to 20 mole % of a chain transfer agent that provides the prepolymer with hydroxyl- or amino-functional radicals, and
  (d) 0 to 20 mole % of an ethylenically unsaturated monomer other than monomers (a), (b) or (c),
  the mole percent of components (a), (b), (c) and (d) being based on the total molar amount of said components; and
(B) at least one monomer reactive with hydroxyl- or amino-functional radicals of the prepolymer.

The invention further relates to contact lenses formed on the above-described silicone-containing composition.

DETAILED DESCRIPTION OF PREFERRED EMBODIMENTS

The hydroxy- or amino-terminated prepolymer derived from ethylenically unsaturated monomers can be synthesized by general techniques known in the art. Generally, these prepolymers are prepared by free radical polymerization of a mixture of the ethylenically unsaturated silicon-containing monomer (a), the ethylenically unsaturated monomer containing a hydroxyl or amino radical (b) and the ethylenically unsaturated monomer (d) (if present), in the presence of the chain transfer agent (c). The chain transfer agent is selected such that the resultant prepolymer has hydroxy- or amino-terminal functional radicals.

Accordingly, the hydroxy- or amino-terminated prepolymer is derived from an ethylenically unsaturated silicone-containing monomer (a). It is noted that since this silicone-containing monomer is included in at least 60 molar percent of the prepolymer, the prepolymer contains a relatively high amount of silicone per molecule which is important in providing the prepolymer with relatively high oxygen permeability is derived from the silicone-containing monomer (a) is preferably included. This precursor to the hydroxy- or amino-terminated prepolymer may include ethylenically unsaturated silicone-containing monomers known in the contact lens art, and it is preferred that this monomer is monofunctional, i.e., including only one ethylenically unsaturated radical. Most preferred are known bulky polysiloxanylalkyl (meth)acrylic monomers represented by Formula (II):

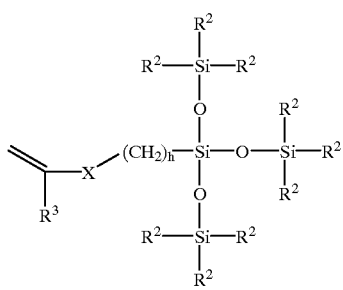
(II)

wherein:

X denotes —COO—, —CONR⁴—, —OCOO—, or —OCONR⁴—where each R⁴ is independently hydrogen or lower alkyl; R³ denotes hydrogen or methyl; h is 1 to 10; and each R² independently denotes a lower alkyl radical, a phenyl radical or a radical of the formula

wherein each R⁵ is independently a lower alkyl radical or a phenyl radical.

Such bulky monomers specifically include pentamethyldisiloxanyl methylmethacrylate, tris(trimethylsiloxy) methacryloxy propylsilane, phenyltetramethyl-disiloxanylethyl acrylate, methyldi(trimethylsiloxy)methacryloxymethyl silane, 3-[tris(trimethylsiloxy)silyl] propyl vinyl carbamate, 3-[tris(trimethylsiloxy)silyl] propyl allyl carbamate, and 3-[tris(trimethylsiloxy)silyl] propyl vinyl carbonate.

The hydroxy- or amino-terminated prepolymer is also derived from the ethylenically unsaturated monomer containing a hydroxyl or amino radical (b). Hydroxy-substituted monomers include hydroxy (meth)acrylates and (meth) acrylamides, such as 2-hydroxyethyl methacrylate, 2-hydroxyethyl acrylate, glycerol methacrylate, glycerol acrylate, and N-2-hydroxyethyl methacrylamide. Amino-substituted monomers include allyl amine. Since the described preferred monomers are typically hydrophilic, it is preferred that the hydroxy- or amino-terminated prepolymer includes no more than 20 molar percent of this monomer so that the resultant prepolymer does not absorb or retain appreciable amounts of water. Monomer (b) provides a functional radical (hydroxy or amino) that is reactive with the chain transfer agent (c).

The hydroxy- or amino-terminated prepolymer may optionally include other monomeric units, i.e., this prepolymer may optionally be derived from ethylenically unsaturated monomer (d) that is distinct from monomers (a) and (b). Generally, this prepolymer precursor will be a non-hydrophilic monomer so that the resultant prepolymer is hydrophobic. Examples are hydrophobic (meth)acrylic esters, such as alkyl (meth)acrylates and fluoroalkyl (meth) acrylates wherein the alkyl moiety contains 1–5 carbon atoms.

The chain transfer agent (c) serves to control the molecular weight of the prepolymer and provides hydroxy- or amino- functionality to the prepolymer, so that the prepolymer can be copolymerized with other monomers reactive with the hydroxy- or amino-functionality. Suitable chain transfer agents include mercapto alcohols (also referred to as hydroxymercaptans) and aminomercaptans. Preferred chain transfer agents include 2-mercaptoethanol and 2-aminoethanethiol. Generally, the molar ratio of chain transfer agent to monomers (a), (b) and (d) will be about 0.01 to about 0.2.

The chain transfer agent (c) is also selected so that it is reactive with the hydroxyl or amino radicals of monomer (b). For example, when monomer (b) contains a hydroxyl radical (from a monomer such as 2-hydroxyethyl methacrylate), suitable chain transfer agents are those that include a radical reactive with the hydroxyl radical, such as 2-mercaptoethanol. When monomer (b) contains an amino radical (from a monomer such as allylamine), suitable chain transfer agents are those reactive with the amino radical, such as 2-aminoethanethiol. Generally, the chain transfer agent will be included at a molar ratio of 1:1 based on the ethylenically unsaturated monomer (b).

Further examples of hydroxy- or amino-terminated prepolymers are provided in the Examples.

The resultant hydroxy- or amino-terminated prepolymer is copolymerized with at least one other comonomer that is reactive with hydroxyl- or amino-functional radicals of the prepolymer to form a thermoplastic elastomer. As used herein, the term "monomer" or "comonomer" denotes monomeric materials that are copolymerizable with the above-described hydroxy- or amino-terminated prepolymer. Thus, these terms include relatively low molecular weight monomeric materials, and relatively high molecular weight monomeric materials also referred to in the art as prepolymers or macromonomers.

Preferably, the hydroxy- or amino-terminated prepolymers are included at about 10 to about 90 weight percent of the monomer mixture (the total weight percent of the monomer mixture being based on weight of the monomeric components), more preferably at about 25 to about 75 weight percent.

One preferred class of comonomers are silicone-containing monomers which will further increase silicone content, along with oxygen permeability, of the resultant elastomer. One suitable class of comonomers are polysiloxane-containing monomers endcapped with hydroxy or amino radicals, represented by Formula (III):

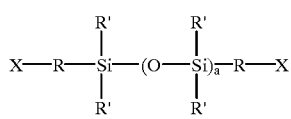
(III)

wherein each X is hydroxy or amino radical;
each R is independently selected from an alkylene group having 1 to 10 carbon atoms wherein the carbon atoms may include ether, urethane or ureido linkages there between;
each R' is independently selected from monovalent hydrocarbon radicals or halogen substituted monovalent hydrocarbon radicals having 1 to 18 carbon atoms which may include ether linkages there between, and
a is an integer equal to or greater than 1.

Preferably, each R' is independently selected from alkyl groups, phenyl groups and fluoro-substituted alkyl groups, and each R is alkylene, preferably butylene. Preferably, a is about 10 to about 100, more preferably about 15 to about 60.

Another preferred class of comonomers are diisocyanates that react with hydroxy- or amino-functionality of the prepolymers (and with hydroxy- or amino-functionality of the silicone-containing monomers of Formula (III)) to form a polyurethane block elastomer (in the case of prepolymers of Formula (I) including hydroxyl-functionality) or polyurea elastomers (in the case of prepolymers of Formula (I) including amino-functionality). Methods for forming thermoplastic urethane or urea copolymers are known in the art, and a representative synthesis is described in the Examples. Generally, any diisocyanate may be employed; these diisocyanates may be aliphatic or aromatic, and include alkyl, alkyl cycloalkyl, cycloalkyl, alkyl aromatic and aromatic diisocyanates preferably having 6 to 30 carbon atoms in the aliphatic or aromatic moiety. Specific examples include isophorone diisocyanate, hexamethylene-1,6- diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate. Other examples are diisocyanates which are the reaction product of a diisocyante and a short-chain diol at a 2:1 molar ratio.

It is preferred to further include as a comonomer a relatively low molecular weight diol or and glycol. These include an alkyl diol, a cycloalkyl diol, an alkyl cycloalkyl diol, an aryl diol or an alkylaryl diol having 1 to 40 carbon atoms and which may contain ether, thio or amine linkages in the main chain. Such materials are useful as chain extenders of the polyurethane or polyurea elastomer. Specific examples include 2,2-(4,4'-dihydroxydiphenyl)propane (bisphenol-A), 4,4'-iso-propylidine dicyclohexanol, ethoxylated and propoxylated bisphenol-A, 2,2-(4,4'-dihydroxydiphenyl)pentane, 1,1'-(4,4'-dihydroxydiphenyl)-p-diisopropyl benzene, 1,3-cyclohexane diol, 1,4-cyclohexane diol, 1,4-cyclohexane dimethanol, neopentyl glycol, 1,4-butanediol, 1,3-propanediol, 1,5-pentanediol, diethylene glycol and triethylene glycol. Especially preferred are alkyl and oxyalkylene diols having 1 to 10 carbon atoms.

Accordingly, a preferred class of elastomers are the polymerization product of a mixture comprising:

(A) the hydroxy- or amino-terminated prepolymer;

(B 1) the silicone containing monomer endcapped with hydroxy or amino radicals, preferably a polysiloxane of Formula (III);

(B2) a diisocyanate, preferably having 6 to 30 carbon atoms in the aliphatic or aromatic moiety;

(B3) and a diol or glycol, preferably an alkylene or oxyalkylene diol having 1 to 10 carbon atoms.

The molar ratio of prepolymer (A) to comonomers (B 1), (B2) and (B3) is preferably within the range of 3:1 to 1:3, most preferably about 1:1.

The monomer mix of the present invention may include additional constituents such as colorants or UV-absorbing agents known in the contact lens art.

The monomer mixes can be cast into shaped articles, such as contact lenses, by methods such as injection or compression molding. More specifically, the monomeric mixture including the hydroxy- or amino-terminated prepolymer and comonomers are charged to a mold cavity having the desired shape of a contact lens and then cured to form a thermoplastic elastomer, with the addition of heat to facilitate curing if desired. The mold may be formed of two mold sections, one mold section shaped to form the anterior lens surface and the other mold section shaped to form the posterior lens surface, and may be either plastic or metal. One advantage of the materials of the invention is that they are suitable for injection molding.

When used in the formation of contact lenses, it is preferred that the subject thermoplastic elastomers have water contents of less than about 5 weight percent and more preferably less than about 1 weight percent. Furthermore, it is preferred that such elastomers have a modulus from about 20 g/mm² to about 150 g/mm², and more preferably from about 30 g/mm² to about 100 g/mm².

If desired, contact lenses prepared from the subject materials may be surface treated to increase wettability using techniques known in the art, for example, plasma surface treatment.

As an illustration of the present invention, several examples are provided below. These examples serve only to further illustrate aspects of the invention and should not be construed as limiting the invention.

EXAMPLE 1

Synthesis of hydroxy-terminated prepolymer is represented by the following synthetic scheme:

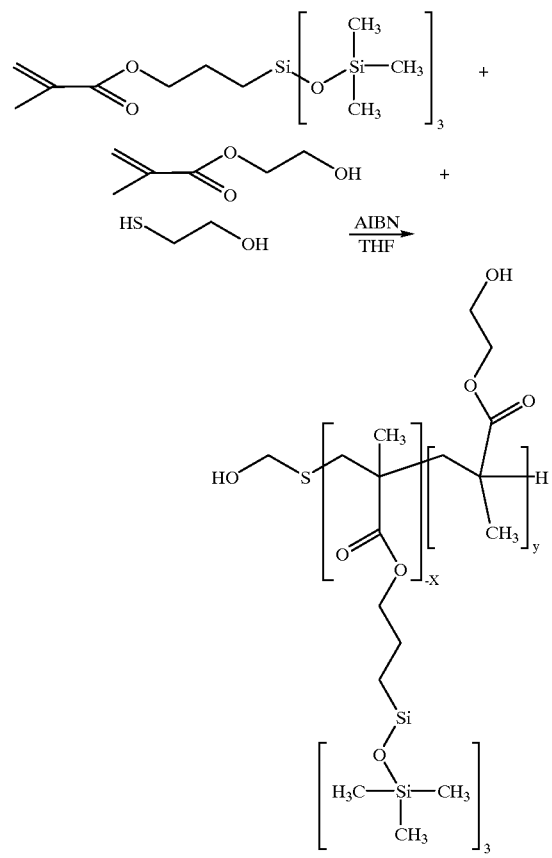

To a dried 500 mL round bottom flask equipped with a reflux condenser was added methacryloxypropyl tris (trimethylsiloxy) silane (TRIS 100 g/0.23 mole), 2-hydroxyethyl methacrylate (HEMA, 9.36 g/0.072 mole) and anhydrous tetrahydrofuran (THF, 100 mL). Oxygen was removed by bubbling a stream of nitrogen through the mixture for 15 minutes. The contents of the flask were then placed under a passive blanket of nitrogen. To the flask was added 2-mercaptoethanol (5.63 g/0.072 mole) and azoisobutylnitrile (AIBN, 0.34 g/0.002 mole) and the mixture was heated for 48 hours at 60° C. Tetrahydrofuran was removed by flash evaporation. The polymer was dissolved in chloroform and washed three times in deionized water. The organic layer was dried over anhydrous magnesium sulfate and the resulting polymer was isolated by flash evaporation of the solvent. Analysis by size exclusion chromatography gave number average molecular weight (Mn) 1991, weight average molecular weight (Mw) 2484, with a polydispersity (Pd) of 1.24 (using polystyrene standards).

EXAMPLES 2,3

Examples 2 and 3 were prepared using the synthesis of hydroxy-terminated prepolymer as described in Example 1. Table 1 illustrates the formulation and resulting properties.

TABLE 1

| Example | TRIS (gram) | HEMA (gram) | Moles | SH-R-OH (gram) | Moles | Mn | Mw | Pd |
|---|---|---|---|---|---|---|---|---|
| 2 | 100 | 4.68 | 0.036 | 2.82 | 0.036 | 2941 | 3714 | 1.28 |
| 3 | 100 | 2.48 | 0.019 | 1.49 | 0.019 | 4210 | 5400 | 1.28 |

EXAMPLE 4
Thermoplastic Copolymer Elastomer Synthesis

To a dried 3-neck round bottom 500-ml flask was added isophorone diisocyanate (IPDI, 3.3192 g/0.0146 mole), neopentyl glycol (NPG, 1.0125 g/0.00972 mole), α,ω-bis (hydroxybutyl) polydimethylsiloxane having a molecular weight of 5,050 (approximately 67 repeating siloxane units) (PDMS, 12.2753 g, 0.00243 mole) and the prepolymer from Example 1 (4.5250 g/0.0243 mole). The molar ratio of IDPI:NPG:PDMS:prepolymer was approximately 3:2:0.5:0.5. To this flask was further added dibutyltin dilaureate (0.0683 g) and dichloromethane (120 ml). The mixture was refluxed under nitrogen. Samples of the reaction product were taken periodically for measurement of IR spectrum, and the reaction was terminated after about 140 hours when the isocyanate peak (2270 cm$^{-1}$) disappeared from IR spectrum of the reaction product. The solvent was then stripped under vacuum to give the polymeric product (Tg=48° C.)

EXAMPLE 5
Film Samples

The product of Example 4 was dissolved in dichloromethane, and films were obtained by casting the solution over glass plates, followed by evaporating the solvent under vacuum. The mechanical properties of the films were determined on an Instron Model 4500 using ASTM methods 1708 and 1938. The films had a tensile modulus of 115 g/mm$^2$ and a tear strength of 22 g/mm$^2$.

EXAMPLE 6
Contact Lens Casting

Ten molds manufactured from polypropylene, having a molding surface to provide an anterior contact lens surface, were charged with 60 mg of a thermoplastic elastomer sample of composition as described in Example 4. A polypropylene mold, having a molding surface to provide a posterior contact lens surface was placed on top of each anterior mold to form a molding cavity therebetween. The two molds were clamped between plates, and then placed between two preheated platens (70° C.) and compressed after 2 minutes under pressure. After 10 minutes, pressure was released. After the molds were cooled to ambient temperature, the molds were separated by removing the posterior mold and the lenses were peeled from the anterior molds. All lenses were optically clear, and they remained clear when saturated in borate buffered saline.

EXAMPLE 7
Comparative Elastomer Synthesis (Elastomer Without Prepolymer of Example 1)

Following the same procedure as described in Example 4, IPDI (2.1982 g, or 0.00966 mole), NPG (0.5045 g, or 0.00484 mole), dibutyltin dilaurate (0.0813 g) and 30 ml of methylene chloride were added and refluxed for 16 hours. Then, α,ω-bis (4-hydroxybutyl) polydimethylsiloxane (23.9278 g, or 0.00473 mole) and 50 ml of methylene chloride were added and refluxed for another 48 hours. After IR measurement of product showed no presence of isocyanate peak, the reaction was suspended. After stripping off solvent, the product was a viscous clear fluid instead of a solid elastomer.

EXAMPLE 8
Synthesis of Thermoplastic Copolymer Elastomer

The procedure described in Example 4 was followed to prepare an elastomer with the same components as described in Example 4, except the ratio of the Example 1 prepolymer and PDMS was changed from 0.5:0.5 to 0.4:0.6. The polymer prepared had Tg of 46° C. The modulus and tear strength of cast films, measured similarly to Example 5, was 62 g/mm$^2$ and 22 g/mm$^2$, respectively.

EXAMPLE 9
Synthesis of Thermoplastic Copolymer Elastomer

The procedure of Example 8 was repeated except NPG was replaced with diethylene glycol. The elastomer prepared had a modulus of 25 g/mm$^2$, and had a tear strength of 16 g/mm$^2$.

EXAMPLE 10
Injection Molding of Thermoplastic Copolymer Elastomer

A polymer sample of Example 8 was dried and injection molded into tensile bars, under the following parameters: feed zone temperature 10° C.; nozzle temperature 110, 120, 130 or 140° C.; mold temperature 20° C.; injection pressure 300 bars; injection speed 10 mm/sec. All tensile bars were optically clear.

Many other modifications and variations of the present invention are possible to the skilled practitioner in the field in light of the teachings herein. It is therefore understood that, within the scope of the claims, the present invention can be practiced other than as herein specifically described.

We claim:

1. A thermoplastic elastomer which is the polymerization product of a monomer mixture comprising:
   (A) a hydroxy- or amino-terminated prepolymer prepared by reacting the following components:
      (a) at least 60 mole % of an ethylenically unsaturated silicon-containing monomer,
      (b) 2.5 to 20 mole % of an ethylenically unsaturated monomer containing a hydroxyl or amino radical,
      (c) 2.5 to 20 mole % of a chain transfer agent that provides the prepolymer with hydroxyl- or amino-functional radicals, and (d) 0 to 20 mole % of an ethylenically unsaturated monomer other than monomers (a), (b) or (c), the mole percent of components (a), (b), (c) and (d) being based on the total molar amount of said components; and (B) at least one monomer reactive with hydroxyl- or amino-functional radicals of the prepolymer.

2. The thermoplastic elastomer of claim 1, wherein component B of the monomer mixture comprises a silicone containing monomer endcapped with hydroxy or amino radicals.

3. The thermoplastic elastomer of claim 2, wherein component B of the monomer mixture further comprises a diisocyanate.

4. The thermoplastic elastomer of claim 3, wherein component B of the monomer mixture further comprises a diol or glycol having 1 to 40 carbon atoms.

5. The thermoplastic elastomer of claim 4, wherein the monomer mixture includes an alkylene or oxyalkylene diol having 1 to 10 carbon atoms.

6. The thermoplastic elastomer of claim 3, wherein component B of the monomer mixture includes a dihydroxy- or diamine-terminated silicone-containing monomer.

7. The thermoplastic elastomer of claim 6, wherein the silicone-containing monomer has the formula:

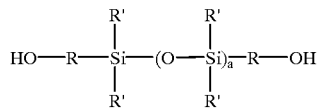

wherein each R is independently selected from an alkylene group having 1 to 10 carbon atoms wherein the carbon atoms may include ether, urethane or ureido linkages therebetween;

each R' is independently selected from monovalent hydrocarbon radicals or halogen substituted monovalent hydrocarbon radicals having 1 to 18 carbon atoms which may include ether linkages therebetween, and a is an integer equal to or greater than 1.

8. The thermoplastic elastomer of claim 7, wherein the monomer mixture further comprises a diol or glycol having 1 to 40 carbon atoms.

9. The thermoplastic elastomer of claim 8, wherein the diol is neopentyl glycol.

10. The thermoplastic elastomer of claim 1, which is the polymerization product of a mixture that includes a hydroxy- or amino-terminated prepolymer (A), a dihydroxy-terminated silicone-containing monomer, a diisocyanate, and an alkylene or oxyalkylene diol having 1 to 10 carbon atoms.

11. The thermoplastic elastomer of claim 1, wherein component (a) of the prepolymer is a compound of Formula (II):

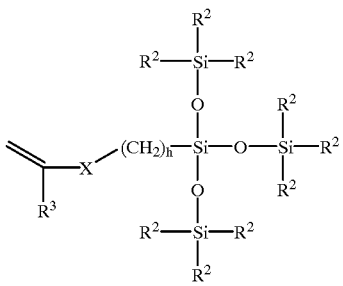

wherein:

X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl radical, a phenyl radical or a radical of the formula —Si(R$^5$)$_3$ wherein each R$^5$ is independently a lower alkyl radical or a phenyl radical.

12. The thermoplastic elastomer of claim 1, wherein component (b) of the prepolymer is selected from the group consisting of hydroxyl-sub stituted (meth)acrylates, hydroxyl-substituted (meth)acrylamides, amino-substituted (meth)acrylates and amino-substituted (meth)acrylamides.

13. The thermoplastic elastomer of claim 12, wherein component (b) of the prepolymer is at least one hydroxyl-substituted (meth)acrylate selected from the group consisting of 2-hydroxyethyl methacrylate, 2-hydroxyethyl acrylate, glycidyl methacrylate, glycidyl acrylate, polyethylene glycol methacrylate, and polyethylene glycol acrylate.

14. The thermoplastic elastomer of claim 11, wherein chain transfer agent (c) of the prepolymer is 2-mercaptoethanol.

15. The thermoplastic elastomer of claim 1, wherein the prepolymer is based on a copolymer of tris(trimethylsiloxy) methacryloxy propylsilane, 2-hydroxyethyl methacrylate and mercaptoethanol.

16. A contact lens formed of a thermoplastic elastomer according to claim 1.

17. A contact lens formed of a thermoplastic elastomer according to claim 6.

18. A contact lens formed of a thermoplastic elastomer according to claim 10.

19. A contact lens formed of a thermoplastic elastomer according to claim 15.

20. The contact lens of claim 16, having a water content less than 5 weight percent and a modulus of elasticity of about 20 g/mm$^2$ to about 150 g/mm$^2$.

21. The thermoplastic elastomer of claim 9, wherein the diisocyante is isophorone diisocyanate.

* * * * *